United States Patent [19]

Rothmel et al.

[11] Patent Number: 5,567,324

[45] Date of Patent: Oct. 22, 1996

[54] METHOD OF BIODEGRADING HYDROPHOBIC ORGANIC COMPOUNDS

[75] Inventors: Randi K. Rothmel, Mt. Holly; Ronald Unterman, Lawrenceville, both of N.J.

[73] Assignee: Envirogen, Inc., Lawrenceville, N.J.

[21] Appl. No.: 476,699

[22] Filed: Jun. 7, 1995

[51] Int. Cl.$^6$ .................................................. C02F 3/34
[52] U.S. Cl. ........................ 210/611; 210/612; 210/909; 134/19; 134/26; 134/42; 435/262.5; 435/821; 588/209
[58] Field of Search .......................... 210/601, 610–613, 210/908, 909; 134/25.1, 26, 19, 40, 42; 588/207, 209, 213; 435/262.5, 821, 874

[56] References Cited

U.S. PATENT DOCUMENTS

| | | | |
|---|---|---|---|
| 4,230,053 | 10/1980 | Deardorff et al. | 110/346 |
| 4,246,255 | 1/1981 | Grantham | 423/659 |
| 4,304,612 | 12/1981 | Masuda | 148/6.3 |
| 4,318,988 | 3/1982 | Cabane et al. | 435/176 |
| 4,340,471 | 7/1982 | Jordan | 210/101 |
| 4,379,746 | 4/1983 | Norman et al. | 208/262 |
| 4,379,752 | 4/1983 | Norman | 210/712 |
| 4,415,658 | 11/1983 | Cook et al. | 435/122 |
| 4,511,657 | 4/1985 | Colaruotolo et al. | 435/253 |
| 4,840,722 | 6/1989 | Johnson et al. | 208/95 |
| 4,851,600 | 7/1989 | Louw | 585/240 |
| 4,999,300 | 3/1991 | Barton | 210/610 |
| 5,064,526 | 11/1991 | Rogers et al. | 208/262.5 |
| 5,211,848 | 5/1993 | Friday et al. | 210/611 |
| 5,362,397 | 11/1994 | Cyr | 210/610 |
| 5,415,777 | 5/1995 | Krempen et al. | 435/262.5 |

OTHER PUBLICATIONS

Heitkamp, M. A., and Cerniglia, C. E., *Appl. Environ. Microbiol.*, 55:1968–1973 (1989).
Bumpus, J. A., *Appl. Environ. Microbiol.*, 55:154–158 (1989).
Narro, M. L., Cerniglia, C. E., VanBaalen, C., and Gibson, D. T., *Appl. Environ. Microbiol.*, 58:1360–1363 (1992).
Narro, M. L., Cerniglia, C. E., VanBaalen, C., and Gibson, D. T., *Appl. Environ. Microbiol.*, 58:1351–1359 (1992).
Pothuluri, J. V., Freemen, J. P., Evans, F. E., and Cerniglia, C. E., *Appl. Environ. Microbiol.*, 58:3654–3659 (1992).
Brown, E. J., Pignatello, J. J., Martinson, M. M., and Crawford, R. L., *Appl. Environ. Microbiol.*, 52:92–97 (1986).
Haggblom, M.., Nohynek, L. J., and Salkinoja–Salonen, M. S., *Appl. Environ, Microbiol.*, 54:3043–3052 (1988).
Apajalahti, J. H. A., and Salkinoja–Salonen, M. S., *Appl. Microbiol. Biotechnol.*, 25:62–67 (1986).
Takase, I., Omori, T., and Minoda, Y., *Agric. Biol. Chem.*, 50(3):681–686 (1986).
Barton, M. R., and Crawford, R. L., *Appl. Environ. Microbiol.*, 54:594–595 (1988).
Kilpi, S., Himberg, K., Yrjala, K., and Backstom, V., *FEMS Microbiol. Ecology*, 53:19–26 (1988).
Asturias, J. A., and Timmis, K. N., *J. Bacteriol.*, 175:4631–4640 (1993).
Furukawa, K., Tonomura, K., and Kamibayashi, A., *Appl. Environ. Microbiol.*, 35:223–227 (1978).
Bedard, D. L., Wagner, R. E., Brennan, M. L., and Brown, J. F., Jr., *Appl. Environ. Microbiol.*, 53:1094–1102 (1987).
Bopp, L. H., *J. Ind. Microbiol.*, 1:23–29 (1986).

(List continued on next page.)

*Primary Examiner*—Thomas G. Wyse
*Attorney, Agent, or Firm*—Synnestvedt & Lechner

[57] ABSTRACT

A method of degrading hydrophobic organic compounds (HOCs) comprising heating the HOCs in the presence of a microorganism capable of metabolizing the HOCs to cause degradation thereof, an embodiment of such method including contacting at ambient temperature said HOCs with a microorganism capable of metabolizing the HOCs for a period of time sufficient to degrade some but not all of the HOCs, heating the HOCs not degraded, and thereafter contacting the HOCs not degraded with a microorganism capable of metabolizing said HOCs.

21 Claims, 3 Drawing Sheets

OTHER PUBLICATIONS

Mueller, J. G., Chapman, P. J., Blattmann, B. O., and Pritchard, P. H., *Appl. Environ. Microbiol.*, 56:1079–1086 (1990).

Shannon, M. J. R., Rothmel, R., Chunn, C. D. and Unterman, R., *Bioremediation of Chlorinated and Polycyclic Aromatic Hydrocarbon Compounds*, 354–358 (1994).

Morris, P. J. and Pritchard, P. H., *Bioremediation of Chlorinated and Polycyclic Aromatic Hydrocarbon Compounds*, 359–367 (1994).

Tognotti, L., Flytzani–Stephanopoulos, M. and Sarofim, A. F., *Environ. Sci. Technol.*, 25:104–109 (1991).

*Industrial Wastewater*, p. 28 (Nov./Dec. 1994).

Mihelcic, J. R. and R. G. Luthy, *Environ. Sci. Technol.* vol. 25:169–177 (1991).

Chambers, C. D., J. Willis, S. G.–Pour, J. L. Zieleniewski, J. F. Rickabaugh, M. I. Mecca, B. Pasin, R. C. Sims, D. L. Sorensen, J. L. Sims, J. E. McLean, R. Mahmood, R. R. Dupont, K. Wagner, Eds., *In Situ Treatment of Hazardous Waste-Contaminated Soils*, Park Ridge, NJ, Second Edition, Noyes Data Corporation, 25–28 (1991).

Sresty, G., H. Dev, and J. Houthoofd, "In Situ Soil Decontamination by Radio Frequency Heating," in *Thermal I: Thermally Enhanced Volatilization* Seminar Sponsored by Air Waste Management Association, Pittsburgh, PA, 125–138 (1993).

Edelstein, W. A., Philipp, H. R., Geisel, D., Ciana, F. A., Ed–Hamamsy, S–A. A., Borowiec, J. C., Uzgiris, E. E. and Elgamal, A., *G.E. Annual*, 229–232 (1991).

"Field Study of in situ Steam Injection and Vacuum Extraction for Recovery of Volatile Organic Solvents," Udell and Stewart, Jr., *UCB–SEEHRL Report 89-2*, University of California Berkeley, CA (1989).

"In situ Steam Stripping of Soils," Nunno et al., International Fact Sheet, Assessment of International Techologies for Superfund Application—Technology Identification and Selection, EPA/600/2-89-017, US EPA (1989).

"Vacuum–assisted Steam Stripping to Remove Pollutants from Contaminated Soil: A Laboratory Study," Lord et al., Proc. Sixteenth Annual Hazardous Waste Symposium on Remedial Action, Treatment of Hazardous Waste, 377, EPA/600/9-90/037, US EPA, Cincinnati, OH, 1990a.

"Laboratory Studies of Vacuum–Assisted Steam Stripping of Organic Contaminants from Soil," Lord et al., Proc. Fifteenth Annual Research Symposium for Land Disposal, Remedial Action, Incineration, and Treatment of Hazardous Waste, 124, EPA/600/9-90/006, US EPA, Cincinnati, OH, 1990b.

"In situ Heating to Destroy and Remove Organics from Soils," Heath, W. O., Proc. Department of Energy/U.S. Air Force Joint Technology Review Meeting, Soil and Groundwater Remediation, Atlanta (Feb. 6–8, 1990).

METHOD OF BIODEGRADING HYDROPHOBIC ORGANIC COMPOUNDS

FILED OF THE INVENTION

The present invention relates to a method of degrading organic waste material, particularly to a method of biodegrading hydrophobic organic (hydrocarbon) compounds such as, for example, polychlorobiphenyls.

Hydrophobic organic compounds (HOCs), such as polyaromatic hydrocarbons (PAHs), are common environmental pollutants known for their toxicity. HOCs enter the environment as a result of their widespread use in a variety of products ranging from wood preservatives to pesticides. They have also entered the environment as waste byproducts from chemical and energy production.

A particularly toxic species of an HOC is a polychlorobiphenyl ("PCB(s)"). Such compounds have been a major source of concern to public and government regulatory authorities. PCBs constitute a diverse family of compounds, which include more than 200 possible forms (congeners) which differ in the number and position of chlorine substituents. A few examples of PCBs include 2-chlorobiphenyl, 3-chlorobiphenyl, 2,3-dichlorobiphenyl and the like.

PCBs were commercially produced as a complex mixture of compounds beginning in 1929. (Production by the major world manufacturer of PCBs ceased in 1977.) PCB mixtures were sold widely under the registered trademark AROCLOR®. These mixtures contained a variety of polychlorinated aromatic compounds and not just PCBs. PCB mixtures were used in a wide variety of applications, including, for example, as dielectric fluids in capacitors and transformers, heat transfer fluids, hydraulic fluids, lubricating and cutting oils, and as additives in pesticides, paints, copying paper, carbonless copy paper, adhesives, sealants, and plastics.

Examples of other HOCs that have been commonly sold include polybromobiphenyls (PBBs); diphenylphenol; 1,1,1-trichloro-2,2-bis(4-chlorophenyl)ethane (DDT); and PAHs which include naphthalene, fluorene, phenanthrene, chrysene, benzo(a)pyrene, and the like.

HOCs have been introduced to the environment in a variety of ways, for example, from leaky storage tanks which are located above or below ground, improperly handled transformers, and spills or improper disposal of waste materials. Upon release into the environment, HOCs have polluted aquifers, soils, and ground water on a far-ranging basis. Such pollution is especially troublesome in the case of PCBs since they are highly resistant to degradation in the environment and accumulate in animal tissues over time. Moreover, PCBs and other HOCs typically have a high affinity for soil and are hydrophobic. They are, therefore, difficult to disassociate from the media in which they are located. The affinity of these compounds for soil has been particularly problematic in attempts to remediate contaminated areas.

The present invention relates to improved means for remediating a medium contaminated with one or more HOCs.

REPORTED DEVELOPMENTS

A known method for remediating a medium contaminated with an HOC is to treat the medium with a microorganism which is capable of metabolizing the HOC to a form which is environmentally compatible, for example, an innocuous or non-toxic form. Such treatment generally involves contacting the HOC with a microorganism which is in an aqueous environment. Effectively accomplishing the foregoing is not an easy task because of various characteristics of HOCs, including, for example, their low solubility.

The recalcitrance of HOCs in the environment is related to the chemical structure of the compounds and their water solubility characteristics. In general, the more complex (for example, the more highly chlorinated) the HOC, the lower its water solubility and the more resistant it is to biodegradation by microbial consortia.

Despite the recalcitrance of HOCs, a number of techniques based on the use of microorganisms have been developed in attempts to degrade and remove PAHs, PCBs, and other hydrophobic organic compounds from contaminated media. However, such techniques are typically quite limited in their flexibility of use and have proven to be less than effective under many conditions. For example, a typical commercial process based on the use of microorganisms is affective in degrading about 40–60 wt% of the PCBs present.

The low solubility and hydrophobic properties of the HOCs frequently result in the contaminant adhering to the solid medium in which the contaminant is located. Consequently, large portions of the contaminant are virtually precluded from contact with microorganisms capable of degrading the HOC. It has, therefore, been a difficult problem to identify particularly effective means by which a higher percentage of the contaminant can be subjected to the degrading effects of microorganisms by overcoming the natural hydrophobic tendencies of the contaminant.

Prior art techniques proposed for coping with the "hydrophobic" problem involve adding to the medium being treated materials such as solvents for the HOC, surface active agents, and caustics. Varying and less than satisfying results have been obtained.

The present invention is related to improved process techniques which involve the use of microorganisms to convert one or more HOCs contained within a contaminated medium to an environmentally acceptable form.

SUMMARY OF THE INVENTION

In accordance with the present invention, there is provided an improved method for degrading an HOC comprising heating said HOC and thereafter contacting said HOC with a microorganism capable of metabolizing said HOC to effect degradation thereof.

In one embodiment of the present invention, a medium contaminated with an HOC is treated initially with the microorganism to reduce partially the concentration of the HOC in the medium, the medium is then heated, and thereafter treated with a microorganism capable of degrading the HOC. Accordingly, one aspect of the present invention comprises a method of degrading an HOC comprising: (A) contacting at ambient temperature said HOC with a microorganism capable of metabolizing said HOC for a period of time sufficient to degrade some, but not all of said HOC; (B) heating the HOC not degraded; and thereafter (C) contacting the HOC not degraded with a microorganism capable of metabolizing said HOC.

Practice of the present invention enables the user to reduce to a greater extent the amount of HOC present in the contaminated medium. Heating of the HOC in effect results in the degradation by the microorganism of amounts of HOC that might otherwise not be achieved. Important and significant advantages associated with the practice of the present invention are illustrated in the examples reported below.

The present invention is different from and is to be distinguished from prior art techniques which involve the heat treatment of HOCs. In general, heat treatment in accordance with prior art techniques involves only the use of temperatures sufficiently high to completely vaporize HOCs in the contaminated medium. See, for example: (1) low temperature thermal desorption, 450° C. - U.S. Pat. No. 4,851,600; (2) radio frequency heating, $\geq$250° C. - Edelstein, W. A., H. R. Philipp, D. Geisel, F. A. Ciani, S.-A. A. El-Hamamsy, J. C. Borowiec, E. E. Uzgiris and A. Elgamal (1991); "RF Ground Heating for Soil Decontamination." *GE Annual Progress Report*, General Electric Corp. Research and Development Center, Schenectady, N.Y. and Seresty, G., H. Dev, and J. Houthoofd (1993); "In Situ Soil Decontamination by Radio Frequency Heating," in *Thermal I: Thermally Enhanced Volatilization* Seminar Sponsored by Air Waste Management Association, Pittsburgh, Pa.; and (3) vitrification, >800° C. -Chambers, C. D., J. Willis, S. G.-Pour, J. L. Zieleniewski, J. F. Rickabaugh, M. I. Mecca, B. Pasin, R. C. Sims, D. L. Sorensen, J. L. Sims, J. E. McLean, R. Mahmood, R. R. Dupont, K. Wagner, Eds. (1991), *In Situ Treatment of Hazardous Waste-Contaminated Soils*, Park Ridge, N.J., Second Edition, Noyes Data Corporation. In addition, incineration at >1200° C. has been used to completely combust HOCs. All of these technologies require application of very high temperatures and are very costly because of the amount of energy required to reach the necessary temperatures. In contrast, heating in accordance with the present invention, that is, in combination with biological treatment, can be carried out at relatively low temperatures (for example, 100° C.) and with the achievement of excellent results.

BRIEF DESCRIPTION OF THE DRAWINGS

FIG. 2A represents Example 8 at 5 weeks immediately following heat treatment (5 hours at 90° C.) demonstrating 48% PCB degradation.

FIG. 2C represents Example 8 after 5 weeks of primary biotreatment demonstrating 50% PCB degradation.

DETAILED DESCRIPTION OF THE INVENTION

A wide variety of materials may be remediated or decontaminated in accordance with the present invention. Examples of such materials include soils, sludges, sediments, dredge tailings, chemical waste and the like. In general, any contaminated material which can be subjected effectively to heat treatment in accordance with the present invention may be remediated in accordance with the present invention.

The level of desired decontamination of a given material will usually be defined on a site-specific and material-specific basis. As an example, acceptable PCB concentration levels can range from about 0.1 part per million (ppm) to 500 ppm, depending on the site of the contamination and ultimate fate of the contaminated material. Again, using PCBs as an example, industrial sites have been required to be decontaminated to the point where PCB concentrations are about 10 to about 50 ppm. Decontamination of residential areas will generally require endpoint PCB concentrations of about 0.1 to about 2 ppm.

For some situations involving, for example, soil or sludge, it may be desirable to excavate the medium and place it in a vessel suitable for treatment with heat and the desired microorganisms.

Any HOC which can be subjected effectively to heat treatment in accordance with the present invention and which can be degraded by a microorganism can be treated in accordance with the process described herein. A few examples of HOCs are: polybromobiphenyls, diphenylphenols, DDT and PAHs including naphthalene, fluoranthrene, fluorene, phenanthrene, and chrysene. It is believed that the present invention will be used most widely in treating PCBs, for example. Mono-, di-, tri-, tetra-, penta- and some hexa-chlorinated biphenyls.

A variety of microorganisms, acting alone or in concert, can be used in the practice of the present invention. In general, any microorganism capable of degrading an HOC may be used. Various microorganisms may be combined to obtain complementary degradative activity against various HOCs or to treat mixed waste streams, such combinations utilizing the different specificities of microorganisms for isomeric forms of a given HOC. For certain applications, a given contaminated medium may be treated with microorganisms having different specificities for given contaminants or their degradative intermediates.

Examples of microorganisms and references discussing microorganisms which may be used in the practice of the present invention are provided hereinbelow. Various of the microorganisms may be used for treating a variety of HOCs.

| Strain | Reference |
| --- | --- |
| PCB-degrading organisms | |
| Pseudomonas LB400 | Bopp, L. H., 1986, J. Ind. Microbiol., 1:23. |
| Alcaligenes eutrophus-H850 Corynebacterium Strain MB1 | Bedard, D. L., Wagner, R. E., Brennan, M. L., and Brown, J. F., Jr., 1987, Appl. Environ. Microbiol., 53:1094. |
| Acinetobacter Strain P6 | Furukawa, K., Tonomura, K., and Kamibayashi, A., 1978, Appl. Environ. Microbiol., 35:223. |
| Rhodococcus globerulus P6 | Asturias, J. A., and Timmis, K. N., 1993, J. Bacteriol., 175:4631 |
| Nocardia Sp. | Kilpi, S., Himberg, K., Yrjala, K., and Backstom, V., 1988, FEMS Microbiol. Ecology, 53:19. |
| Pseudomonas Sp. | Barton, M. R., and Crawford, R. L., 1988, Appl. Environ. Microbiol. 54:594 |
| Pseudomonas Sp. | Shannon, M. J. R., Rothmel, R., Chunn, |
| Rhodococcus Sp. | C. D., and Unterman, R., 1994, Biodegradation of Chlorinated and Polycyclic Aromatic Hydrocarbon Compounds, Lewis Publishers, 354. |
| Bromo biphenyl-degrading strain | |
| Pseudomonas cruciviae | Takase, I., Omori, T., and Minoda, Y., 1986, Agric. Biol. Chem., 50:681. |

-continued

| Strain | Reference |
| --- | --- |
| Pentachlorophenol-degrading strains | |
| *Rhodococcus chlorophenolicus* | Apajalahti, J. H. A., and Salkinoja-Salonen, M. S., 1986, Appl. Microbiol. Biotechnol., 25:62 |
| Mycobacterium Sp. | Haggblom, M.., Nohynek, L. J., and Salkinoja-Salonen, M. S., 1988, Appl. Environ, Microbiol., 54:3043. |
| Flavobacterium Sp. | Brown, E. J., Pignatello, J. J., Martinson, M. M., and Crawford, R. L., 1986, Appl. Environ. Microbiol., 52:92. |
| PAH-degrading strains | |
| *Cunnighamella elegans* | Pothuluri, J. V., Freemen, J. P., Evans, F. E., and Cerniglia, C. E.,. 1992, Appl. Environ. Microbiol., 58:3654. |
| *Agmenellum quadruplicatum* | Narro, M. L., Cerniglia, C. E., VanBaalen, C., and Gibson, D. T., 1992, Appl. Environ. Microbiol., 58:1351. |
| *Oscillatoria sp.* | Narro, M. L., Cerniglia, C. E., VanBaalen, C., and Gibson, D. T., 1992, Appl. Environ. Microbiol., 58:1360. |
| *Phanerochaete chrysosporium* | Bumpus, J. A., 1989, Appl. Environ. Microbiol., 55:154. |
| *Pseudomanas paucimobilis* | Mueller, J. G., Chapman, P. J., Blattmann, B. O., and Pritchard, P. H., 1990, Appl. Environ. Microbiol., 56:1079. |
| Mycobacterium Sp. | Heitkamp, M. A., and Cerniglia, C. E., 1989, Appl. Environ. Microbiol., 55:1968. |
| DDT-degrading strains | |
| *Alcaligenes eutrophus* A5 | Nadeau, L. J., Menn, F. M., Breen, A., and Sayler, G. S., 1994, Appl. Environ. Microbiol., 60:51. |

In preferred embodiments of the present invention, cultures of *Pseudomonas cepacia* are used to degrade HOCs, specifically PCBs. Cultures of *Pseudomonas cepacia* have been deposited with the American Type Culture Collection, 12301 Parklawn Drive, Rockville, Md. 20852. In particular, a sample of the microorganism used in examples set both below and referred to herein as "ENV 391" was deposited with the ATCC on Nov. 9, 1993 and has been given the identifying number ATCC 55487. The organism shall be made available to the public in accordance with the terms of the Budapest Treaty. A second microorganism, *Rhodococcus sp.*, referred to herein as ENV 360 is utilized in the Example section of the application and may be used in combination with ENV 391 for a variety of remediation methods. Based on experience, observations can be made respecting the combined use of the aforementioned two cultures in treating PCB-contaminated soils/sludges containing different PCBs. It has been observed that ENV 391 is effective in degrading 2,5,3', 4'-tetrachlorobiphenyl, whereas ENV 360 performs poorly on this PCB; however, ENV 360 is effective in degrading 2,4,5,4'-tetrachlorobiphenyl, which is not degraded by ENV 391. It is noted that both of these PCB congeners contain four chlorine atoms.

In some circumstances, maximum PCB degradation can be achieved in a mixed culture of ENV 391 and ENV 360 when there is a 20–25 fold excess of ENV 391 relative to ENV 360. The difference in the concentrations of the microorganisms is related to differences in the growth and degradative kinetics of the microorganisms. The desired ratio of organisms in a given inoculum will vary, however, depending on the properties of the microorganisms themselves and the nature of the contaminant.

Remediation of contaminated mediums can be enhanced by providing the microorganism with one or more growth substrate(s). The nutritional requirements of a given microorganism may be determined prior to using the microorganism. This information can be employed to increase the growth and metabolic activity of the microorganism. The growth substrate(s) may be selected from a wide number of substrates such as, for example, glucose, galactose, rhamnose, succinic acid, dextrose, fructose, lactic acid, citric acid, glycerol, glutamine biphenyl, PAH, or any selected hydrocarbon. Any suitable growth substrate which does not further contaminate the medium can be used.

The ability of a given microorganism to utilize various carbon sources can be determined using a variety of techniques known in the art, including diagnostic tests such as the diagnostic system sold by BIOLOG™. This kit comprises a 96-well microplate containing 95 different carbon sources and water as a control. The microplate facilitates determination of the specific carbon sources that a given microorganism is capable of utilizing. Accordingly, one can determine readily which carbon sources may be used to supplement the growth of a given microorganism(s).

In those embodiments in which an indigenous soil microorganism is provided with nutrients to enhance its growth, the microorganism can be identified by methods such as a fatty acid profile combined with other microbiological diagnostic techniques well known in the art. Accordingly, if so desired, an indigenous organism possessing an ability to degrade PCBs may be isolated and characterized and its optimal growth requirements determined.

Heat treatment of the HOC in accordance with the present invention can be used in combination with prior art methods which are designed to increase the solubility of HOCs based on desorption of HOCs from the medium, for example, the soil in which it is held, and on diffusion of the HOCs into the involved aqueous phase. These methods include the use of surfactants, solvents and caustic treatments. In the practice of the present invention, surfactants (anionic, cationic or non-ionic), caustic to greater than pH 10, or solvents (such as acetone, methanol, etc.) may be added after primary biotreatment and prior to heat treatment to enhance desorption of hydrophobic organic compounds if necessary. In the case of surfactants, they must be compatible with the aerobic degrading organism (i.e., not inhibitory). In the case of solvents, the solvents may need to be recovered (depending on concentration) prior to the secondary biotreatment. For caustic additions, the pH must be adjusted to neutral prior to the second stage biotreatment.

The HOC can be heated in any suitable way. Based on the type of contaminant, the extent of contamination, and the nature and final intended use of the medium to be remediated, either in situ or ex situ methods of remediation can be chosen.

If it is determined that the contaminated medium should be treated in situ, a variety of heating methods are available. Exemplary methods are described in connection with the remediation of a contaminated soil. It should be understood, however, that the present invention can be applied to a variety of contaminated media and is not limited to soils.

Initially, the heat input requirement for a particular site may be calculated to aid in determining the most cost effective way to treat the soil. One may calculate the minimal heat required to heat soil from ambient to a desired temperature in BTU using the following equation: minimal heat required in BTU=(pounds of soil (lbs.))(specific heat of soil BTU/lbs° F.)($\Delta$T° F.)+(pounds of water)(specific heat of water) ($\Delta$T° F.) where specific heat is a constant that varies upon soil type. The typical value for sand is between about 0.3 and 0.7, the typical value for clay is between about 0.3 and 0.7, and the typical value for peat is between about 0.3 to 1.2. Water has a heat capacity of 1.0.

The expression "$\Delta$T" is the difference in temperature between ambient and desired final heating temperature.

Additional heat may be required if temperature is elevated above the boiling point of the soil moisture and to account for heating the hydrophobic organic compound itself.

Exemplary methods for heating a site include, but are not limited to, steam heating, radio frequency heating, joule resistance heating, hot air/gas injection, and conductive heating. It is anticipated that any of these methods may be used in the practice of the present invention to heat a contaminated site. The preferred method for a given site will depend primarily on the nature of the contamination at the site and the geology at the site.

Steam heating has been used in a variety of remediation methods. In particular, a method referred to in the art as steam stripping has been used to vaporize contaminants. (In the practice of the present invention, however, it is not necessary to vaporize the contaminants since it is preferred to have the contaminants degraded in situ by the microorganisms.) Although this method has been directed primarily to vaporizing contaminants, it may be used also to heat a target site to a desired temperature for the purposes of the present invention. Typical steam stripping methods involve delivering steam to the contaminated zone via injection wells; heating the contaminated zone to vaporize the contaminants or increase their mobility; and creating a pressure gradient to control movement of the contaminants and of the steam condensate front to a recovery point.

The steam injected into a well spreads from the injection point and condenses. When the steam condenses, energy is transferred to the surrounding soil thereby increasing its temperature. An important consideration in the use of this method is the placement of the steam injection wells to provide uniform steam penetration throughout the target zone. There are two primary methods whereby the steam may be introduced and dispersed in the target zone.

In the first method, the steam is injected into a supply well and is drawn through the contaminated zone by a vacuum. The steam injection wells are installed to inject steam at or below the level of the contamination. The wells are placed throughout the formation so as to fully saturate the contaminated area. Well-spacing depends on the permeability of the formation. In field tests, well spacing of approximately 1.8 m (6 ft.) has been used at sites having a variety of soils, including sandy silts, clay and sand. General background information on methods utilizing steam injection may be found in "Field Study of in situ Steam Injection and Vacuum Extraction for Recovery of Volatile Organic Solvents," Udell and Stewart, Jr., *UCB-SEEHRL Report* 89-2, University of California Berkeley, Calif. (1989); and in "In situ Steam Stripping of Soils," Nunno et al., International Fact Sheet, Assessment of International Techologies for Superfund Application—Technology Identification and Selection, EPA/600/2-89-017, US EPA (1989). Steam pressure typically is about 40 kPa (6 psig) for well depths of approximately 6 m (20 ft.). Pressures as high as 79 kPa (11.5 psig) have been used in laboratory tests. In the practice of the present invention, the steam pressure need only be adjusted to levels that will heat the target site soil to the desired temperature. To facilitate the flow of the injected steam through the contaminated site, vacuum wells (Udell and Stewart 1989) or a vacuum applied at the soil surface under a flexible membrane liner covering may be employed. General information on steam stripping methods may be found in "Vacuum-assisted Steam Stripping to Remove Pollutants from Contaminated Soil: A Laboratory Study," Lord et al., Proc. Sixteenth Annual Hazardous Waste Symposium on Remedial Action, Treatment of Hazardous Waste, 377, EPA/600/9-90/037, US EPA, Cincinnati, Ohio, 1990a; and in "Laboratory Studies of Vacuum-Assisted Steam Stripping of Organic Contaminants from Soil," Lord et al., Proc. Fifteenth Annual Research Symposium for Land Disposal, Remedial Action, Incineration, and Treatment of Hazardous Waste, 124, EPA/600/9-90/006, US EPA, Cincinnati, Ohio, 1990b.

In the second method, steam and hot air are injected from drill bits as the bits are rotated in the contaminated zone. This method employs a process tower, which supports a pair of cutting blades at the end of a hollow shaft. The cutting blades are rotated in opposite directions as they are lowered vertically into the soil. The blades can reach depths of 9.1 m (30 ft.). The cutting heads break up the soil and thereby assure the flow of gases. Steam, at 200° C. (400° F.), and compressed air, at 135° C. (275° F.), are piped through the shafts to nozzles located on the cutter blades. A steel shroud (3.0 m (10 ft.) by 1.8 m (6 ft.) by 2.1 m (7 ft.)) covers a 2.2 m (7.3 ft.) by 1.2 m (4 ft.) area of soil undergoing treatment. Larger areas are treated by multiple application of overlapping treatment blocks (La Mori 1989).

Another method for heating soil in situ involves the use of radio frequency (hereafter "RF") heating. RF heating has the potential of increasing subsurface temperatures to the desired temperature in the practice of the present invention. In this method, radio-frequency waves are used to deliver energy to the target zone. The radio waves induce molecular motion and thereby heating in a manner analogous to the heating provided by a microwave oven.

The RF system utilizes electrodes or antennae connected to a radio-frequency generator. They transmit radio-frequency waves into the target zone, with some of the energy of the waves being absorbed for heating. The electrodes can be inserted into holes drilled into the target zone or positioned on the surface of the target zone. A modified radio transmitter serves as the power source. The broadcast frequency is in the industrial, scientific, and medical band. Operating frequency of the transmitter is chosen based on the dielectric properties of the target zone and the size of the area containing the contaminant.

Yet another exemplary method used to heat soils is referred to as Joule Resistance Heating. This method uses the soil as the conduction path for an electrical current. Energy lost due to the electrical resistance of the soil heats the soil. One important consideration in using this method lies in the drop in electrical conduction which results from decreased soil moisture content. Since current density is highest near the electrodes, the soil in this area will dry faster, resulting in an increase in electrical resistance and a decrease in the heating rate.

In one embodiment, this heating method utilizes an array of conductors formed by inserting metal pipes into the contaminated soil ("In situ Heating to Destroy and Remove Organics from Soils, " Heath, W O., Proc. Department of Energy/U.S. Air Force Joint Technology Review Meeting, Soil and Groundwater Remediation, Atlanta (Feb. 6–8, 1990)). An electrical current is then passed between the electrodes to heat the soil.

Yet another example of a method for heating contaminated soil employs the injection of hot air or other hot gas. Hot air injection can raise soil temperature; however, because of the very low heat capacity of gases, it has a more limited application than some of the other methods discussed herein. As an example, air injection at a temperature of 100° C. (212° F.) into a sandy soil with a heat capacity of 9.5 cal/cm$^3$-° C. at a typical soil venting airflow rate of 100 m$^3$/ hr (328 ft$^3$/ hr) with a radius of influence of 8 m (26 ft.), a 4 m-thick (13-ft-thick) soil column at 10° C. (50° F.), would warm at the average rate of approximately 0.15° C./d. As the soil warmed, the rate of warming would decrease.

Yet another method for heating contaminated soil utilizes warm water injection. Water has a much higher heat capacity than air. In soils sufficiently permeable to make water injection practical, warm water injection may represent a preferred approach to increasing soil temperatures. In this connection, it is noted that there is basis for the view that the present invention is effective, at least in part, because the contaminant is released from a hydrophobic association with soil into an aqueous phase where the contaminant can be degraded by the microorganism. Accordingly, for soil with a low moisture content, consideration should be given to providing water to increase the moisture content. If water is added, consideration should be given to adding warm water so that additional heat will not be required to heat the water once it has been introduced in the target area. Since water can be added only at temperatures below 100° C. (212° F., the boiling point of water a 1 atm), this method is limited in both the heat input and the upper temperatures that can be obtained.

A particularly preferred method for heating the contaminated medium involves conductive heating. In conductive heating, a heat source is placed on the soil surface or inserted into the formation. As the temperature of the heater is raised, the soil is heated by conduction. Electrical resistance heaters are preferred in conductive heating. It is expected that, in the practice of the present invention, electrical resistance heaters in the form of "electric blankets" may be particularly useful. Using such blankets, an area to be remediated can be covered with a blanket and the heat adjusted such that the desired temperature is reached. Since such heating will necessarily result in a gradient of highest heat at the surface and decreased heat as one moves away from the heat source, the heat source may be adjusted so as to provide the desired temperature at a given depth in the soil.

Conductive heating is advantageous in that it is probably the least complicated heating technology and capital costs are low in comparison with other methods. An additional advantage is that electrical resistance heaters can be purchased off-the-shelf for many applications.

In certain situations it may be determined that ex situ treatment is preferred. In these situations, heating utilizing a reactor-based system may be based on air, steam or hot oil systems.

The capacity of reactor systems can range from between 1 cu.ft. up to 800 cu.ft. of soil. Heating is accomplished using a jacketed reactor that can be heated using water-glycol, steam or hot oil heating Systems that are readily available from industrial manufacturers.

Other apparatus available in the art for in situ or ex situ heating of soils, sludges or sediments may be employed. Whatever apparatus is used, it is preferred that it be effective in providing relatively uniform heat in the treatment zone.

The amount of heat supplied and the length of heating time are site-specific and will be dependent on the contaminant to be treated. It is believed that the most widely used conditions will include heating to a temperature of about 50° C. to about 150° C. for a period of time of about 5 min to about 5 hours. A preferred range of heat treatment utilizes temperatures of about 75° to about 95° C. For some applications, temperatures above about 100° C. may significantly reduce the cost effectiveness of treatment. Both the time and temperature employed should be minimized for cost effectiveness, while taking into account the extent of desorption of the HOCs from the material being treated.

The following embodiments are exemplary of the present invention.

In a first embodiment, a medium contaminated with a HOC is treated by contacting the medium with a microorganism(s) capable of degrading the HOC. This initial treatment with a microorganism is referred to, for convenience, as a "primary biotreatment" and can occur in situ or in an ex situ reactor. The microorganism(s) used in the primary biotreatment can be supplied as an inoculum or indigenous microorganisms capable of degrading the HOC can be enriched in the medium through nutrient supplementation. In preferred embodiments utilizing an inoculum, liquid media containing the desired microorganism(s) is sprayed onto the site to be remediated and tilled into the ground. The temperature of the media containing the microorganisms will depend on the type of microorganism employed but will normally be in the range of about 24° C.±4C°. The amount of added microorganisms can range from about $1\times10^7$ to $1\times10^{10}$ cells/gram soil. These amounts will depend on the target of the remediation and the kinetics of the degrading microorganisms. The volume of innoculum added for in situ treatment should be minimized so as not to flood the plot of ground being treated. The types of media suitable for growth of the microorganism will vary according to the nature of the microorganisms being used. An example of a suitable media is provided in the Example section of the present application. The primary biotreatment can be implemented until the readily desorbable and diffusible HOC has been biodegraded.

Following the primary biotreatment, the medium is heated, for example, to a temperature of about 50° C. to about 150° C. for a period of time such as, for example, about 5 min to about 5 hours. It is preferred to use the lowest temperature suitable for desorbing the HOC from the medium to minimize energy costs. The medium is then cooled to below 30° C. and subsequently contacted with additional amounts of suitable microorganism(s) for a period of time sufficient to achieve maximum degradation.

In the aforementioned embodiment, the process of heating the medium followed by microbial degradation can be repeated two or more times to reduce the level of contamination to the desired or required level. For some applications, the final level of contamination will be defined by the on a site-by-site basis. The United States Environmental Protection Agency's statement of the remedy for a superfund site cleanup is referred to as the "Record of Decision". The Record of Decision will usually specify a cleanup target and the technologies that can be implemented at the site to do the remediation.

In another embodiment of the present invention, the contaminated medium is not treated initially with a microbial population, but is first heated to the desired temperature, for example, to about 50° C. to about 150° C. for a period of time such as, for example, about 5 min to about 5 hours.

The medium is then cooled and subsequently contacted with the microorganism(s) capable of metabolizing the HOC for a period of time necessary to reach maximum degradation. This process of heating the medium followed by microbial degradation can be repeated two or more times to achieve a sufficiently reduced level of contaminant.

Figure 1A:
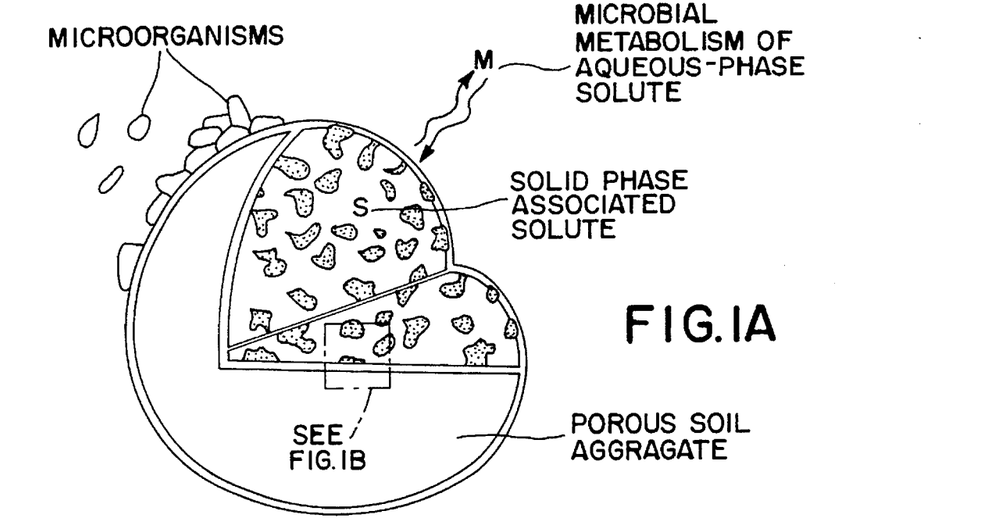
FIG. 1A is a schematic of processes occurring during the microbial degradation of a hydrophobic organic compound in a soil-water supension. Microorganisms are size excluded from the micropores, and local equilibrium exists between solute in micropore water and on micropore surfaces. Adapted form Mihelcic and Luthy, 1991.
Figure 1B:
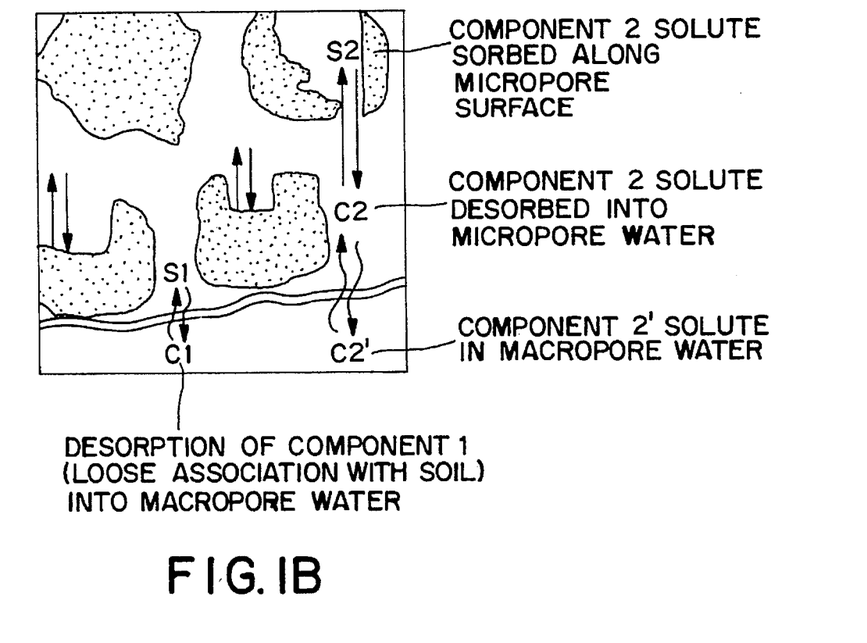
FIG. 1B is an enlarged view of the boxed region shown in FIG. 1A.
Figure 2A:
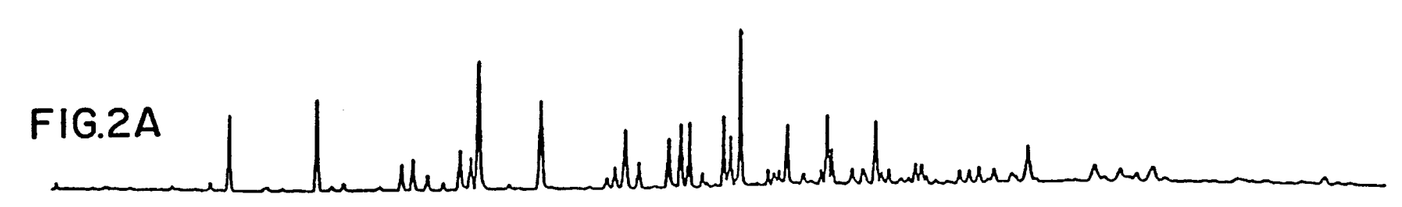
FIGS. 2A through 2D are a series of chromatograms from sequential biological-heat-biological treatment of soil.
Figure 2B:
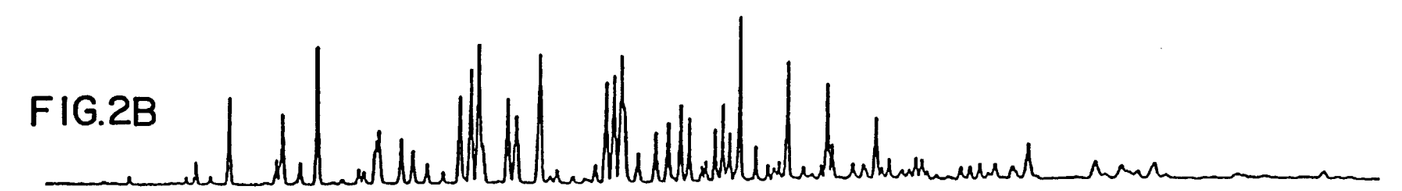
Figure 2C:
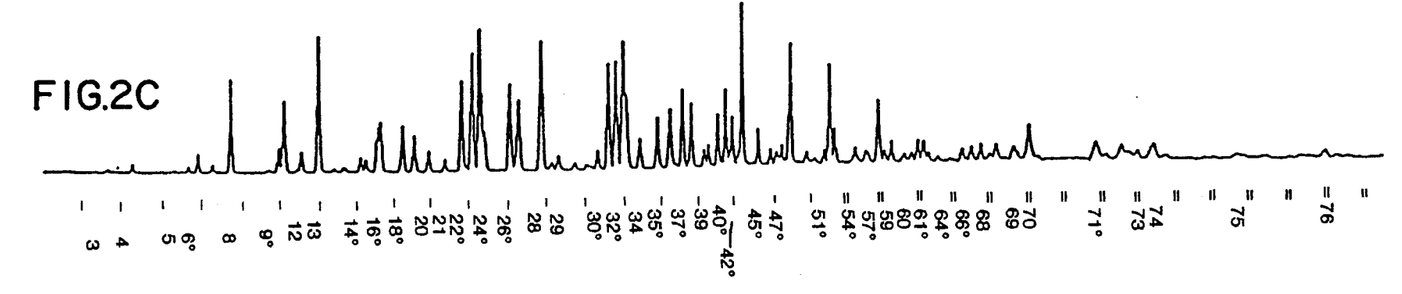
Figure 2D:
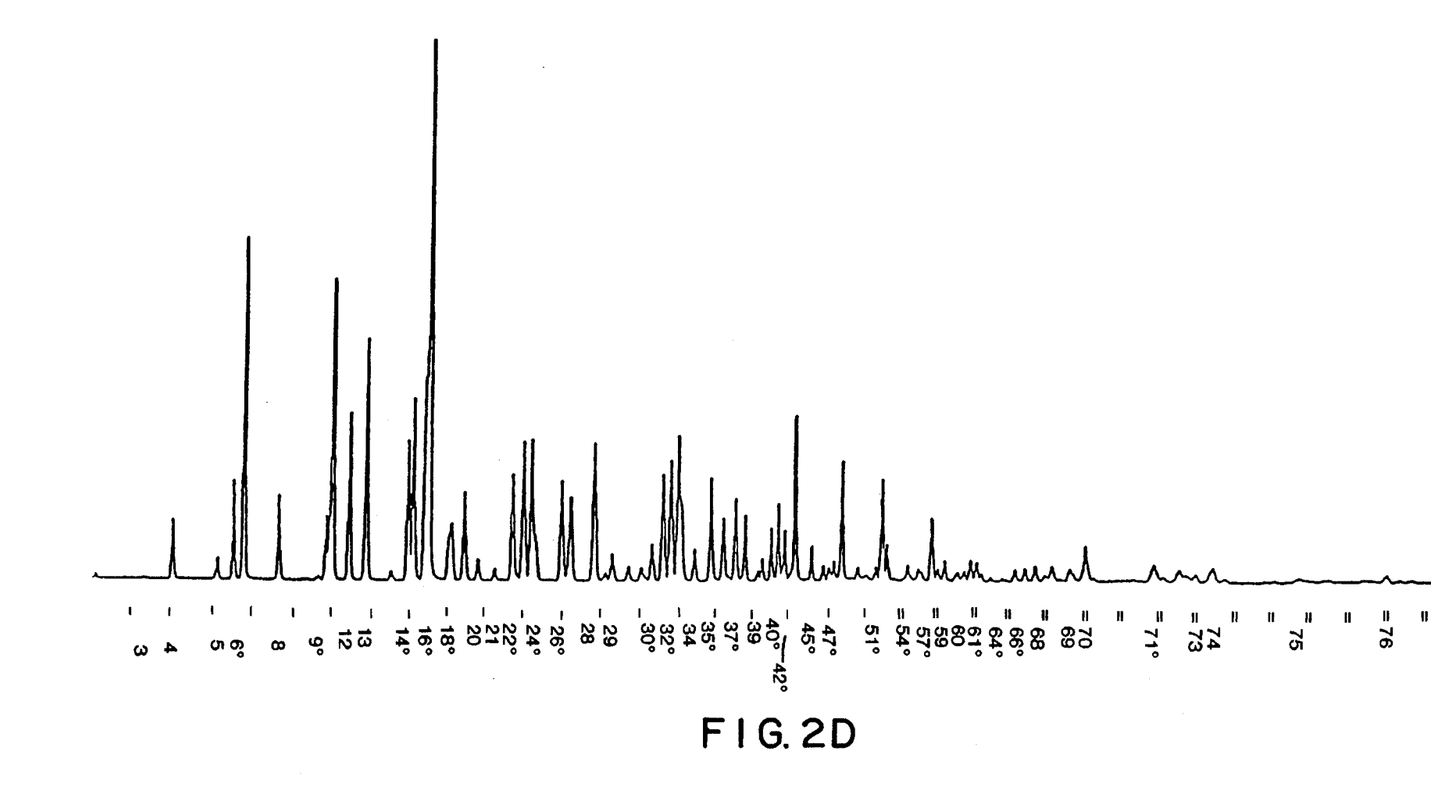

A general model of microbial degradation that can be used to describe microbial degradation of PCBs is illustrated in FIG. 1 (proposed in Mihelcic, J. R. and R. G. Luthy [1991]. "Sorption and Microbial Degradation of Naphthalene in Soil-Water Suspensions under Denitrification Conditions." *Environ. Sci. Technol.* Vol. 25: 169–177.) This model proposes that the rate of PCB degradation is initially proportional to the concentration of soluble HOC (component C1) in the bulk aqueous phase and active cell population. As the bulk solubilized HOCs are degraded, a concentration gradient develops between the soil and water and allows HOCs that are either dissolved within the micropore water or loosely associated with the outside soil surface (component 1 solute; S1) to readily desorb to reestablish the soil/water equilibrium. Over time, the readily desorbable fraction moves into the bulk aqueous phase (C1) where it is transported into a second organic phase, namely microorganisms, where biodegradation occurs. Once the labile HOC fraction is transported from the soil into the bacterium, a nonequilibrium state develops where desorption of a second compound of the HOC (S2) that is strongly bound to and within the soil particle is dependent on the very slow rate of solubilization and intra-aggregate or intra-organic matter diffusion (S2→C2). Once this second component (S2) enters the micropore water as C2, the HOC can then slowly diffuse from the soil particle (C2→C2). As a result of this nonequilibrium desorption, there is an apparent threshold that is reached in terms of HOC degradation that is related partially to the immediately bioavailable or desorbable HOC. It is theorized that the present invention is effective because its use increases the rate at which amounts of the HOC diffuse into the bulk aqueous phase. Based on this model, it is assumed that the heat treatment acts to increase the rate of the intra-organic matter diffusion (S2→C2), therefore, effecting the amount of HOC diffusing out of the soil micropore water (C2→C2').

EXAMPLES

The following examples are illustrative of the practice of the present invention. They include the use of two different HOC-degrading microorganisms in conjunction with heat. Comparative examples are set forth also. The examples demonstrate the excellent degradation and remediation capabilities of the present invention. All of the examples utilized PCB as an exemplary contaminant.

Throughout the Examples, a standard procedure for determining the extent of PCB degradation was used.

To determine the concentration of PCBs present in a given sample, the following procedure was followed.

Sludge/Soil PCB Analysis: Extraction and Gas Chromatography

The analytical method described hereinbelow is capable of resolving the PCB mixture Aroclor 1221 into 14 specific peaks, and Aroclors 1242, 1248, 1254 and 1260 each into 31 to 44 specific peaks. Since each of the higher Aroclors contains up to 50 to over 80 PCBs, some congeners do coelute under the capillary conditions that are used. However, this technology is state-of-the-art for PCB congener resolution and allows one to determine PCB concentrations based on specific peak calibration in contrast to a more general pattern-recognition method. This analytical method also allows one to evaluate the Aroclor GC profile for evidence of "weathering" that might be due to in situ biological activity.

Sample Preparation and Analysis

Approximately 2–5 grams of a sample are placed into a pre-weighed 50 ml serum vial. The sample is amended with an equal volume (i.e., ml/g sample) of distilled $H_2O$, and this mixture receives 10 ml diethyl ether as the extracting solvent. The vials are shaken on a rotary shaker for 24 hours, and the ether phase is then transferred to a 1.5 ml chromatography vial for analysis. When needed, the original ether extract can be either concentrated or diluted to ensure accurate sample analysis. To determine the sample's PCB concentration based upon dry weight, the extracted sludge is desiccated and its weight measured.

Samples that contain interfering substances are cleaned using appropriate methods. Non-PCB oils (hydraulic fluids, mineral oil, etc.) are removed from extracts by passing the extracts through a conditioned magnesium silicate matrix (LC-Florisil, Supelco). The retained PCBs are eluted from the matrix with a hexane wash, and the wash is either diluted or concentrated for GC analyses. Samples that are found to contain elemental sulfur are cleaned by combining 2 ml of the sample extract with 1 ml of TBA reagent (3.39 g tetrabutylammonium hydrogen sulfate and 25 g sodium sulfite in 100 ml $H_2O$) and 1 ml of 2-propanol. After mixing for 5 minutes, an additional 3 ml of $H_2O$ is added to remove the alcohol and TBA reagent. The ether layer is then transferred to a GC vial for analysis.

The ether extracts are analyzed on a Varian model 3400. GC (Varian, Synnyvale, Calif.) equipped with an electron capture detector (300° C.), a split/splitless capillary injector (300° C.; Varian model #1077), and a fused silica column (30 m×0.25 mm [inner diameter]) coated with a 0.25 μm bonded liquid phase of polydimethylsiloxane (DB-1, J&W Scientific, Inc., Folsom, Cailf.). The column is temperature programmed from an initial temperature of 160° C. to 200° C. at 2° C./min (no hold time), to 240° C. at 8° C./min and held for 10 minutes. If the sample contains co-contaminating substances that may interfere with subsequent runs, a third ramp is added after the 10 minute hold time to 260° C. at 8° C./min and is held for 5 minutes. The gas flow rates are set with the carrier gas (He) at 23 cm/sec (0.67 ml/min); makeup gas ($N_2$) at 33 ml/min; and a split ratio of 16.

Chromatograms of the extracted samples are integrated on a peak-by-peak basis, and the area of each peak is normalized with respect to standard Aroclor mixtures of known PCB composition. After a sample has been analyzed, its dry weight is determined and the quantity of total PCB is reported as a concentration using the following relationship:

$$\mu g\ PCB/gram\ of\ sample = \left[ \frac{Total\ PCB\ mass\ (\mu g)}{Sample\ dry\ weight\ (g)} \right]$$

Samples that have been biotreated are extracted and analyzed as described above, and the extent of PCB biodegradation is reported as percent PCB reduction with reference to an untreated control. The amount of PCB observed in both the biotreated and untreated samples is first normalized with respect to an internal standard, and the percent degradation is then calculated by using the following relationship:

% Degradation =

$$\left(1 - \left(\frac{\text{PCB in Biotreated Sample (normalized)}}{\text{PCB in Untreated Control (normalized)}}\right)\right) \times 100$$

Growth of Microorganisms Used in Examples

The PCB-degrading strains described in the examples were grown in liquid Basal Salts Media (BSM). BSM is made by combining two stock solutions: BSM A and BSM B. The 20×stock of BSM A basal salts contains, per liter of distilled water: 85 g $K_2HPO_4 \cdot 7H_2O$; 20 g $NaH_2PO_4 \cdot H_2O$; 40 g $NH_4Cl$. A 20×trace element solution (BSM B) is adjusted to pH 4–5 and contains, per liter of distilled water: 2.46 g nitrilotriacetic acid, 4.0 g $MgSO_4 \cdot 7H_2O$, 0.24 g $FeSO_4 \cdot 7H_2O$, 0.06 g $MnSO_4$, 0.06 g $ZnSO_4 \cdot 7H_2O$, and 0.02 12 g $CoCl_2 \cdot 6H_2O$. Prior to use, the two combined stocks were diluted to a 1×concentration for the BSM media. If needed, the medium was adjusted to a final pH of 6.8 with the dropwise addition of 0.1N HCl. Stock cultures (~25 ml) were grown to an $OD_{550}$ (optical density at 550 nm) of 1–2 using biphenyl at 26° C.; they were stored at 4° C. for no longer than 10 days. When the cultures were grown in large batch to be used in a soil degradation study, they were grown to an $OD_{550}$ of 1–2 using biphenyl as the sole carbon source, and were used immediately. An $OD_{550}$ of 1 is equivalent to approximately $1.5 \times 10^9$ cells of ENV 391 and $6 \times 10^8$ cells of ENV 360. The inocula used to begin the stock and working cultures were 2–5% (v/v). Alternatively cultures can be grown in BSM supplemented with either lactate of-benzoate (5–10 mM) to high optical densities ($OD_{550}$=10–30), these cells are then frozen at −80° C. in 10% DMSO (dimethyl sulfoxide). The frozen cells are used directly in bioaugmentation studies. In this case the activity of the frozen cultures were revived by diluting the frozen culture into fresh BSM to an $OD_{550}$ of 3–5 in the presence of lactate as a growth substrate. The cells are slurried at 26° C. for 3–5 hours prior to use in the bioslurry reactors.

The first group of examples describe test work that shows that the bioavailability of PCB contaminants in a soil sample can be increased by heating the contaminated soil.

Samples of a low organic, high clay-containing soil contaminated with 110 ppm of PCB (AROCLOR® 1248, Monsanto), referred to hereinafter as "soil A", were used in these tests. Two PCB-degrading microorganisms, ENV 360 and ENV 391, were also used in these tests. ENV 360 is a culture of *Rhodococcus sp.* ENV 391 is a culture of *Pseudomonas cepacia*.

To conduct the studies, approximately 2 grams of soil were prepared as a 10% aqueous slurry (2g of soil in 10 ml of Basal Salts Medium (BSM).

Example 1 (Heat and Biotreatment)

This example demonstrates the use of the microorganisms ENV 360 and ENV 391 to reduce levels of PCB contamination in soil samples after heating the soil samples.

Samples of a 10% aqueous slurry of untreated soil A were heated at either 60° C., 100° C., or 150° C. (see Table 1 below) in sealed serum vials for 2.5 hours. The vials heated to 100° C. and 150° C. were vented using a needle to prevent pressure build up in the vials. Following heat treatment, the vials were cooled and water was added to make up for any volume loss. (Heat treatment to 150° C. caused the samples to dry to completeness). Thereafter, fresh nutrients in the form of Basal Salts Medium (BSM) and PCB-degrading microorganism strains ENV 360 and ENV 391 (final concentration of $1 \times 10^9$ cells per ml comprising $5 \times 10^8$ cells/ml of each cell type grown in BSM-biphenyl media.) were added to the vials, which were then incubated at room temperature (25° C.±3C.°) for three days on a shaker. At the end of the incubation period, the PCB level in the sample was determined.

Comparative Example 1 (C-1—Heat/No Biotreatment)

Soil samples like those of Example 1 were treated in the manner described in Example 1, except that the samples were not treated with the microorganisms. After the samples had cooled, the PCB concentration was determined.

Example 2 (Biotreatment/Heat/Biotreatment)

In this example, samples of soil A like those of Example 1 were pretreated with ENV 391 and ENV 360 prior to heating of the samples. The pretreatment, which lasted for 6 days, achieved a reduction in PCB concentration of about 45–50%, Pretreatment conditions were as follows: Soil A at 20% concentration [40g/200 ml final volume containing BSM and $5 \times 10^8$ cells/ml of both ENV 391 and ENV 360.]The samples were then treated like the samples of Example 1, including heat treatment at the aforementioned temperatures and subsequent treatment with strains ENV 360 and ENV 391. At the end of the incubation period, the PCB concentration was determined.

Comparative Example 2 (C-2—Biotreatment/Heat)

In this example, soil samples like those of Example 2 were pretreated with ENV 391 and ENV 360 and then heated in the manner referred to in Example 2, but the samples were not subjected to a secondary treatment with ENV 360 and ENV 391 following the heat treatment. After the samples had cooled, the PCB concentration was determined.

Example 3
(Biotreatment+Supplement/Heat/Biotreatment)

In this example, soil samples like those of Example 2 were heated like those of Example 2, except that the pretreatment with ENV 391 and ENV 360 additionally included use of the supplementary growth substrates biphenyl and lactate.

Cells in BSM media were added at T=0 at a final concentration of $1 \times 10^9$ cells/ml ($5 \times 10^8$ cells/ml each cell type). Biphenyl was added at 0.05% (wt/vol) at the start of pretreatment, at 0.1% (wt/vol) at 24 hours. Lactate was added at 5 mM (final concentration) at 48 and 96 hours.

At the end of the incubation, the PCB concentration in the samples was determined.

Comparative Example 3 (C-3 - Biotreatment-Supplement/Heat)

The soil samples of this example were like those of Example 3 and they were treated like the samples of Example 3, but after pretreatment with "supplemented" ENV 391 and ENV 360 and heating thereof, they were not subjected to a secondary treatment with ENV 391 and ENV 360. After the samples had cooled, the PCB concentration was determined.

The percentage of reduction in PCB concentrations of the soil samples described in the aforementioned examples are reported in Table 1 below. The percentage of PCB degradation in all Examples was calculated based on controls which received only the heat treatment. These controls correct for PCB loss due to volatilization during heat treatment.

TABLE 1

| Examples | % PCB degradation | | | |
|---|---|---|---|---|
| | 25° C. | 60° C. | 100° C. | 150° C. |
| C-1 - Heat/No Biotreatment | 0 | 0 | 0 | 0 |
| 1 - Heat/Biotreatment | 52 | 49 | 51 | 58 |
| C-2 - Biotreatment/Heat | 44 | 47 | 52 | 45 |
| 2 - Biotreat./Heat/Biotreat. | 51 | 67 | 73 | 68 |
| C-3 - Biotreat.-Supp/Heat | 49 | 52 | 52 | 58 |
| 3 - Biotreat.-Supp./Heat/Biotreat. | 57 | 69 | 74 | 71 |

The results reported in Table 1 above show that heat treatment significantly improves biodegradation when the soil is subjected to a biological pretreatment. This is best demonstrated in Example 3 where the heat treatment at 100° C. resulted in 74% PCB degradation, a 22% increase in degradation relative to that achieved by corresponding Example C-3.

The second group of examples shows that the use of multiple cycles of a heat-biotreatment process can result in increased biodegradation of PCBs. In these examples, five soil slurry samples were prepared using a soil similar in composition to the soil used in Example 1 (referred to hereinafter as "soil B") and contaminated with PCB (Aroclor® 1248, Monsanto) at a concentration of approximately 300 ppm.

Four of the slurry samples were first biologically treated at room temperature (25° C.) with PCB-degrading organisms for 24 hours. Each sample was then heated to a temperature as indicated in Table 2 below, with the exception of one sample which was kept at room temperature. Following heat treatment, each of the slurries received a secondary biological treatment. A fifth sample was treated in the same manner as the other samples but did not receive a biotreatment prior to heating. Following treatment, the samples were analyzed to determine the extent of PCB degradation and subsamples were taken from the most extensively degraded sample to undergo a second cycle of heat and biotreatment.

Comparative Example 4 (C-4—Biotreatment/No Heat Treatment)

In this example, a 200-ml bioslurry was prepared using soil B at a 20% solids concentration (40 g soil in 200 ml (total volume) medium. The medium consisted of BSM media added from stock solutions to a final volume of 200 ml. In particular, water was used to bring the volume to 180 ml and 10 ml of BSM stocks A and B were added for a final volume of 200 ml. The bioslurry was mixed at room temperature with an overhead stirrer at approximately 250 rpm. The slurry was inoculated at t=0 with ENV 391 and ENV 360 at a final concentration of $1\times10^9$ cells per ml. ($5\times10^8$ per ml of ENV 391 and $5\times10^8$ per ml of ENV 360) grown in BSM-biphenyl. At 24 hrs, a fresh inoculum of cells was added. ($5\times10^8$ cells/ml of both ENV 391 and ENV 360) After an additional 24 and 48. hrs (48 and 72 h from t=0, respectively) lactate was added to a final concentration of 5 mM. Soil subsamples were analyzed for PCB concentration at the indicated timepoints.

Examples 4–6

Three 200 ml bioslurries (Examples 4, 5 and 6) were prepared as described in comparative Example 4 except that at 24 h, slurries were heated at the temperatures shown in Table 2 for a 2 hour period in sealed mason jars. The slurries were then re-equilibrated to room temperature before loosening the lids and adding freshly grown PCB-degrading organisms to all samples at a final concentration of $1\times10^9$ cells per ml ($5\times10^8$ cells/ml of each cell type). After an additional 24 h and 48 h (48 h and 72 h from t=0, respectively) lactate was added to all slurries to a final concentration of 5 mM. Soil subsamples were analyzed for PCB concentration at the indicated timepoints (Table 2).

Example 7

To determine the level of PCB degradation in the absence of a biological pretreatment, a soil slurry (slurry E) was prepared as described above. for Examples 4–6, but did not receive a cell inoculum at time 0.

Based on the results, the rate of PCB degradation did not appear to be altered by heating the sample prior to biotreatment, as seen by comparing Example 7 (in which the soil was heated prior to any augmentation with a PCB degrading organism) to comparative Example 4 which was not heated.

TABLE 2

Percent degradation of PCB over time.

| Example | Temperature (°C.) | % PCB degradation at t = h | | | | | |
|---|---|---|---|---|---|---|---|
| | | 0 h | 24 h | 26 h[1] | 48 h | 72 h | 144 h |
| Comparative Ex. 4 | 25 | 0 | 32 | 35 | 43 | 55 | 66 |
| Ex. 4 | 60 | 0 | 42 | 42 | 51 | 59 | 68 |
| Ex. 5 | 85 | 0 | 36 | 32 | 48 | 56 | 67 |
| Ex. 6 | 95 | 0 | 43 | 46 | 56 | 64 | 75 |
| Ex. 7 | 85 | 0 | 0 | 0 | 26 | 42 | 58 |

Results are an average of two soil analyses, except in the case where only one analysis was conducted or a duplicate analysis showed chromatographic anomalies.
[1]Results reported in this column are from samples taken following the 2 hour heat treatment.

The results reported in Table 2 indicate that the extent of PCB degradation was enhanced in Example 6 where the sample received a sequential biological-heat-biological treatment resulting in 75% PCB degradation at 144 hours. In contrast, PCB degradation in comparative Example 4 reached 66% at 144 hours.

As shown in Table 2, Example 6 (heated to 95° C.) demonstrated the most extensive degradation (75%) over the course of the first treatment cycle. Subsamples from this slurry were reheated to 95° C. in sealed vials for two hours followed by treatment with fresh PCB-degrading organisms as described above for an additional 72 h. The final level of PCB-degradation obtained with these subsamples was 85%, corresponding to a reduction in the PCB concentration in this soil sample from 350 ppm to 52 ppm.

The second treatment cycle (heat followed by microbial treatment) achieved additional degradation, whereas simply redosing a subsample from the first treatment cycle with fresh PCB-degrading organisms did not result in any increase in degradation over the 75% level obtained in the first treatment cycle. This supports the hypothesis that the heat treatment is responsible for enhanced PCB degradation.

Controls indicated that the increase in PCB degradation was not due to volatilization during the heat treatment itself since samples analyzed following the heat treatment were identical to within experimental error of samples analyzed prior to the heat treatment.

A third set of examples illustrates the use of the present invention to treat a highly contaminated sediment. In these examples, bioreactors were prepared containing a river sediment contaminated with PCB at a concentration of 4000 ppm.

The initial biological PCB degradation took place over a five-week period due to the high level of PCB contamination. Following this initial five-week period, the sediment samples were heated, followed by a second biological treatment which lasted two weeks.

Example 8

Contaminated river sediment was added to a 350 ml bioreactor to a 15% solids concentration (52.5 g soil in 350 (total volume) ml medium. The media consisted of water and nutrients $PO_4$ $NH_4$, $NO_3$ (phosphate, nitrogen).

The PCB degrading microorganisms, ENV 391 and ENV 360, were added to the bioreactor to a final concentration of about $5.0 \times 10^9$ cells/g of ENV 391 and about $2.0 \times 10^8$ cells/g of ENV 360. Biphenyl was added as a cosubstrate at 0.1%. Over the course of the primary biotreatment (5 weeks at room temperature (25° C.)), additional phosphorus, nitrogen and biphenyl were added as required for maintenance of biological activity. In particular, the bioreactors contained:

1) 128 g river sediment at a 40% solids concentration (equivalent to 52.5 g dry material);

2) 17.5 ml of stock phosphate solution (800 ppm final P), 6.5 ml stock ammonium chloride solution (190 ppm final N), and 1.5 ml stock potassium nitrate solution (24 ppm final N). The stock solutions were as follows: phosphate -85 g/L of $K_2HPO_4.3H_2O$ combined with 20 g/L of $NaH_2PO_4.H_2O$ yielding approximately 16,116 ppm P; ammonium chloride —40 g/L $N_4Cl$ providing approximately 10,470 ppm N; and potassium nitrate -40 g/L $KNO_3$ providing approximately 5,540 ppm N.

3) 10 ml ENV 360 at $1.1 \times 10^9$ cells/ml (to give $2 \times 10^8$ cells/g), 20 ml ENV 391 at $5.25 \times 10^9$ cells/ml (to give $2 \times 10^9$ cells/g). These cells were grown in large fermentation vessels in BSM supplemented with benzoate (5–10 mM) and were grown to high optical densities (the OD at 550 nM was greater than or equal to 10). The cells were then frozen in 10% dimethyl sulfoxide and used as stock innoculum;

4) biphenyl was added once a week at 0.1% wt/volume.

Nutrient levels were tested 1–2 times a week and fresh nutrients were added if levels dropped below 50 ppm for phosphate and ammonium. Enough nutrient was added from the stock solutions to give more than 100 ppm of P or N. Nitrate levels were adjusted if below 10 ppm to greater than 25 ppm N. The results demonstrated 50% PCB degradation following three weeks of treatment. No additional PCB degradation was detected at the 4th or 5th week sampling. For the secondary biotreatment, samples at the 5-week timepoint were heated at 90° C. for a period of 5 hours. After cooling the Sample, fresh PCB-degrading organisms (ENV 360 and ENV 391) were added in the same manner as in the primary biotreatment. This secondary biotreatment continued for a period of two weeks. Accordingly, the entire treatment time from primary biotreatment through the secondary biotreatment was 7 weeks. Samples taken at the end of this seven-week period demonstrated 73% PCB degradation.

Comparative Example 8 (No Microbial Activity)

A 350 ml bioreactor was prepared using the same protocol used in Example 8 including the secondary biotreatment, however mercuric chloride was added to eliminate microbial activity in both the primary and second biotreatments.

The results obtained after the initial five-week period demonstrated no PCB degradation. Similarly, the results obtained after the secondary biotreatment showed no PCB degradation at seven weeks.

Although the river sediment sample in Example 8 showed very significant degradation in the first stage primary biotreatment, the degraded PCB congeners were primarily the lower chlorinated congeners, even though many of the higher chlorinated congeners are known to be biodegradable as shown in FIG. 2. (Lower chlorinated congeners appear on the left side of the chromatograph, while higher chlorinated congeners comprising tetrachlorobiphenyls and more highly chlorinated congeners appear towards the right side of the chromatograph).

To determine if the bioavailability of the higher chlorinated congeners could be increased, a heat treatment followed by a secondary biotreatment of this sample was conducted.

FIG. 2 shows the effect of the heat and second stage biotreatment on PCB-degradation. The chromatogram indicates that the lower chlorinated congeners (left ⅓ of chromatogram) were aerobically degraded during the primary biotreatment stage of the slurry reactor. The application of heat resulted in enhanced desorption of the higher chlorinated PCBs (right ⅔ of chromatogram) which were bound to the soil and helped solubilize these PCBs into the bulk aqueous phase, thereby effectively increasing the contact between PCB-degrading organisms and the PCB during the secondary biotreatment, resulting in increased PCB degradation. The chromatograms suggest that the heat treatment primarily enhanced degradation of the higher chlorinated congeners. This supports the hypothesis that these congeners, which are the most hydrophobic and have the lowest aqueous solubility, were not available to the microbial population during the primary biotreatment.

What is claimed is:

1. A method of degrading an HOC comprising:

(A) contacting at ambient temperature said HOC with a microorganism capable of metabolizing said HOC for a period of time sufficient to degrade some, but not all of said HOC;

(B) heating the HOC not degraded; and thereafter (C) contacting the HOC not degraded with a microorganism capable of metabolizing said HOC.

2. The method defined in claim 1 wherein the microorganisms of steps (A) and (C) are the same.

3. The method defined in claim 1 wherein said microorganisms are selected from the group consisting of *Rhodococcus sp.* and *Pseudomonas cepacia* ATCC 55487.

4. The method defined in claim 1 wherein said microorganisms of steps (A) and (C) are different.

5. The method defined in claim 1 wherein said nondegraded HOC is heated to a temperature of about 50° C. to about 150° C.

6. The method defined in claim 1 wherein said nondegraded HOC is heated for a period of time of about 30 min to about 5 hours.

7. The method defined in claim 1 wherein said HOC is selected from the group consisting of polychlorobiphenyls, polybromobiphenyls, diphenylphenols, DDT and PAHs.

8. The method defined in claim 1 wherein said microorganisms of steps (A) and (C) comprise a mixture of at least two different microorganisms.

9. A method of remediating a medium contaminated with an HOC comprising:
 (A) heating a medium which has included therein HOC and HOC which has been metabolized by a microorganism; and
 (B) treating said heated medium with a microorganism capable of metabolizing those HOC which have not been metabolized to effect degradation thereof.

10. The method defined in claim 9 wherein said medium is selected from the group consisting of soil, sludge, sediment and chemical waste.

11. The method defined in claim 9 wherein said microorganisms of steps (A) and (B) are the same.

12. The method defined in claim 9 wherein said microorganisms of steps (A) and (B) are different.

13. The method defined in claim 10 wherein said microorganisms are selected from the group consisting of *Rhodococcus sp.* and *Pseudomonas cepacia* ATCC 55487.

14. The method defined in claim 10 wherein said medium is heated to a temperature of about 50° C. to about 150° C.

15. The method defined in claim 10 wherein said medium is heated for a period of time of about 30 minutes to about 5 hours.

16. The method defined in claim 10 wherein said HOC is selected from the group consisting of polychlorobiphenyls, polybromobiphenyls, diphenylphenols, DDT and PAHs.

17. A method of degrading an HOC comprising:
 heating said HOC and thereafter contacting said HOC with a microorganism capable of metabolizing said HOC to cause degradation of said HOC.

18. The method defined in claim 17 wherein said microorganisms are selected from the group consisting of *Rhodococcus sp.* and *Pseudomonas cepacia* ATCC 55487.

19. The method defined in claim 17 wherein said HOC is heated to a temperature of about 50° C. to about 150° C.

20. The method defined in claim 17 wherein said HOC is heated for a period of time of about 30 minutes to about 5 hours.

21. The method defined in claim 1 wherein said medium is selected from the group consisting of soil, sludge, sediment and chemical waste.

\* \* \* \* \*